Oct. 2, 1962 W. E. BASSETT ET AL 3,056,372

SOLDERING MACHINE

Filed May 23, 1960 2 Sheets-Sheet 1

INVENTORS
W. E. BASSETT
R. A. CARBONE

By [signature]
ATTORNEY

INVENTORS
W. E. BASSETT
R. A. CARBONE
By W. A. Johnson
ATTORNEY 3,056,372
Patented Oct. 2, 1962

3,056,372
SOLDERING MACHINE

Wilbur E. Bassett, Marblehead, and Robert A. Carbone, Haverhill, Mass., assignors to Western Electric Company, Incorporated, New York, N.Y., a corporation of New York Filed May 23, 1960, Ser. No. 31,042
5 Claims. (Cl. 113—126)

This invention relates to apparatus for soldering undersurfaces of articles, particularly wiring boards.

It has been determined that one of the most desirable methods of soldering component leads to the circuits of wiring boards is by dipping the undersurfaces of such boards in a stream of solder. However, to obtain the most efficient results, that is to have uniform soldering of all connections of the component leads with the wiring circuits, it is necessary to control not only the lowering of the wiring boards to submerge their undersurfaces in the stream of solder, but more particularly, to control the movement of the wiring board away from the solder stream to utilize a moving roller formation of the solder, which has been formed at the back edge of the wiring board while held in the stream, so that it will form a wiping action the full length of the undersurface of the wiring board.

The object of the present invention is an efficient apparatus for soldering undersurfaces of articles and to accomplish the aforementioned desired results.

Other objects and advantages will be apparent from the following detailed description when taken in conjunction with the accompanying drawings wherein.

Figure 1:
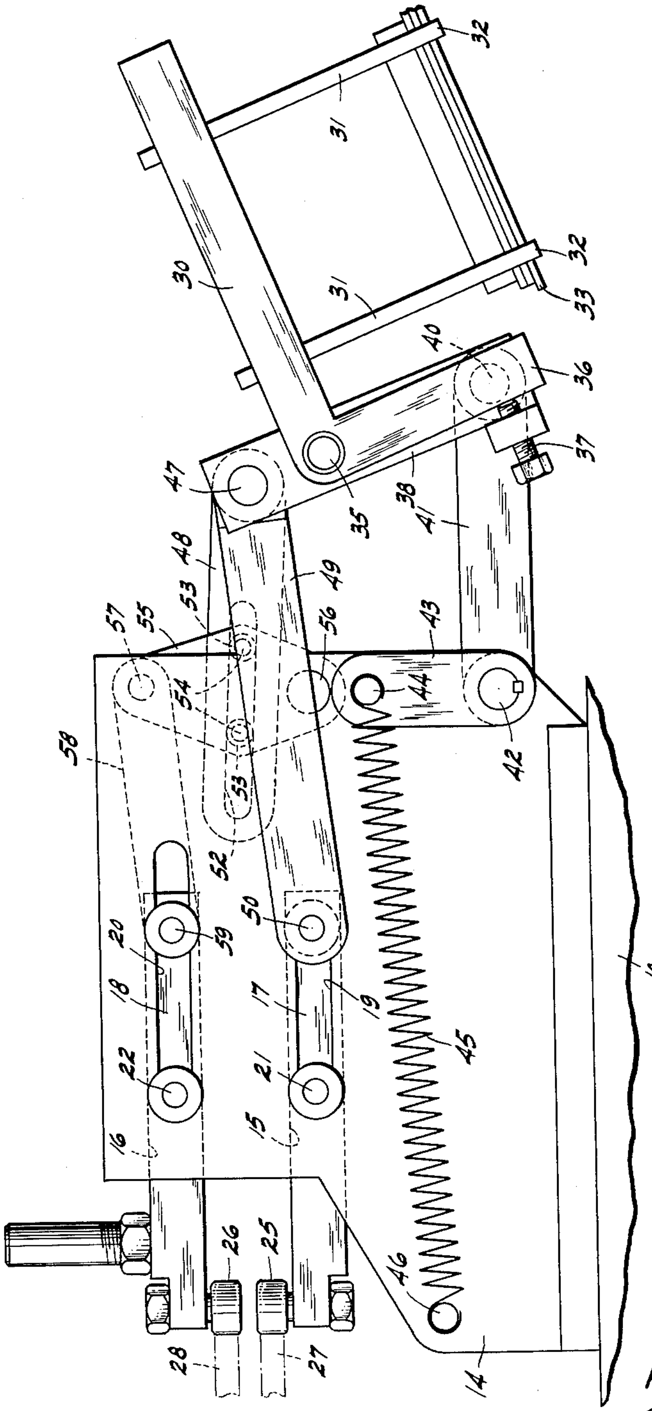
FIG. 1 is a side elevational view of the apparatus shown in the loading and unloading position.

The apparatus includes a suitable support 10 mounted above a stream of solder 11 flowing continuously in the direction of the arrow 12. A frame 14 is mounted on the support 10 and has parallel guideways 15 and 16 for slides 17 and 18, respectively. Elongated apertures 19 and 20 in the frame 14 have pins 21 and 22 extending therethrough and mounted on their respective slides 17 and 18 to serve as stops in movement of their respective slides to the left under the actions of suitable springs not shown. The left ends of the slides 17 and 18 have rollers or cam followers 25 and 26 supported thereby and held by their respective springs in engagement with cams 27 and 28. The contours of the cams determine the movements of the slides 17 and 18.

A holder 30 having suitable parallel members 31 with means 32 at their lower ends to removably receive and hold an article 33, which, in the present instance, is a wiring board with suitable components mounted on the upper surface thereof and their leads connected in a conventional manner such as by bending into engagement with the circuits of the undersurface of the article or wiring board. The holder 30 is pivotally supported at 35 and has a leg 36 resting against an adjustable stop 37 which may vary the angular position of the holder 30 and particularly the article or wiring board 33 with respect to a positioning element 38 which supports the pivot 35 as well as the adjusting screw 37.

The lower end of the positioning element 38 is pivotally supported at 40 on the outer end of an arm 41 which has its inner end fixed to a shaft 42. A lever 43 fixed to the shaft 42 carries a pin 44 at its upper end which is connected to one end of a spring 45, the other end being fixed to a pin 46 mounted on the frame 14. The upper end of the positioning element 38 is under the control of both cams 27 and 28 and their slides 17 and 18. A shaft or spindle 47, mounted in the upper end of the positioning element 38, rotatably supports an arm 48 and one end of a link 49. The link 49 has its other end pivotally connected at 50 to the adjacent portion of the slide 17 and, as a result of this structure, longitudinal movement of the slide 17 will cause the link 49 to bring about rocky movement of the positioning element 38 on the shaft 40.

The arm 48 has an elongated aperture 52 therein for receiving a spaced pair of rollers 53 mounted on spindles 54 carried by a rocking member 55. The rocking member 55 has its lower end rotatably mounted on a spindle 56 and its upper end connected at 57 to one end of a link 58, the other end of a link being connected to the slide 18 by a pin 59 which extends completely through the slide and through the elongated aperture 20 to serve as a stop for the inward or movement to the right of the slide 18.

*Operation*

When the apparatus is in the position shown in FIG. 1, the article or wiring board 33, which has been soldered may be removed and another article or wiring board to be soldered is placed in the holder and held therein by the holding means 32. When this has been accomplished, the article 33 is in position A in FIG. 3. During each cycle of operation of the apparatus, through each cycle of rotation of the cams 27 and 28, the article will be moved from position A, FIG. 3, to position B and then to position C where it will be held for a given length of time and, during this time, a roll or high portion 60 of the solder in the stream, will be dammed up back of the edge of the article as long as the article remains partially submerged in the solder stream.

Figures 2, 3:
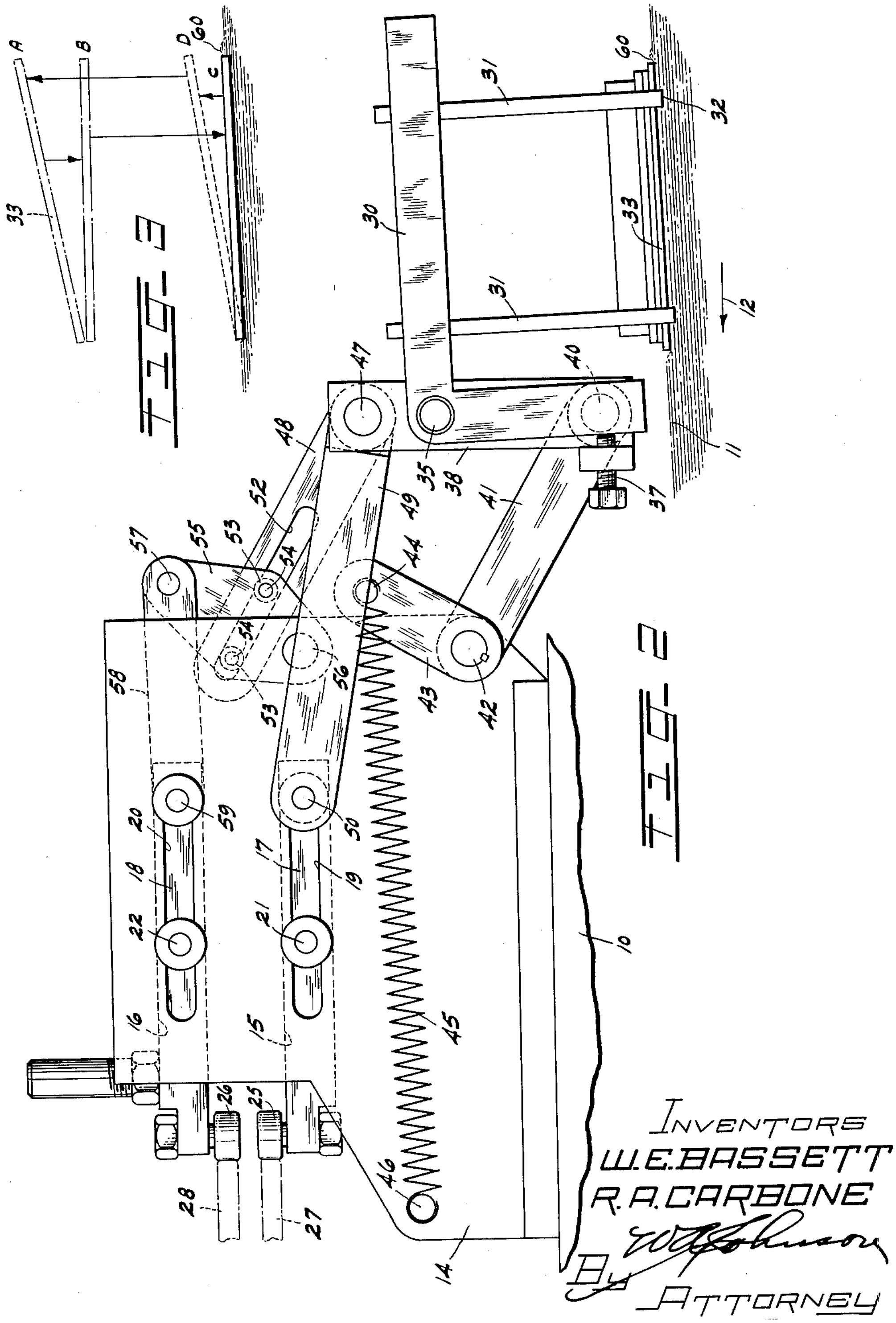
FIG. 2 is a side elevational view of the apparatus shown in its soldering position.
FIG. 3 illustrates the four (4) important positions of each article or wiring board brought about through the operation of the apparatus.

The next action of the apparatus is to tilt the article or wiring board slowly as about a pivot at the left edge of the wiring board, FIG. 3, from the position C to the position D. By moving the article slowly during this tilting action from position C to position D, the roll 60 of solder will move from the position shown in attempting to travel with the stream of solder and will form a wiping action of the solder on the undersurface of the wiring board, thus completing a most efficient soldering of the leads of the components to the wiring circuits of the board. From position D, the article or wiring board is returned to position A.

These actions, as illustrated in FIG. 3, are carried out by a combined series of actions of the cams 27 and 28 on their followers 25 and 26 to move the slides 17 and 18. The first action, viewing FIG. 1, is for the cam 27, its follower 25, and the slide 17, to move from the normal position, shown in FIG. 1, to the position shown in FIG. 2. This action of the slide 17, while the slide 18 remains in its normal position, will result in rocking the positioning element 38 about the axis of the spindle 40 to move the holder 30 so that the article or wiring board will be positioned parallel with the surface of the stream 11. During movement of the slide 17, the link 49 will move the upper end of the positioning element 38 and move with it, the arm 48 relative to the rollers 53 of the member 55. At the end of this movement, the cam 28 will move its follower 26 to move the slide 18 to the end of its movement to the right, as shown in FIG. 2, to rock the member 55 about its pivot 56 and cause the spaced rollers 53 to rock the arm 48 which functions somewhat like a pantograph system with the arm 41 to move the holder 30 downwardly while maintaining the article parallel with the stream 11 until the article is partially submerged or the lower surface thereof is moved into the stream of solder.

At this time, the stream of solder will flow underneath the article or wiring board to solder the leads to the circuits thereof. If, by any chance, there should be air pockets adjacent the leads and their respective circuits, these air pockets will be washed away leaving a complete soldering of the respective circuits and terminals by the rolling action of the roller or raised portion 60 of the solder stream, during the next action of the apparatus. This action is brought about by the cam 27 permitting the slide 17 to move to the left to tilt the positioning element 38 and the holder 30 to move the article from position C to position D. Following this action, cam 28 permits movement of the slide 18 to the left to rock the member 55 to return the positioning member and the holder to the normal position indicated by A in FIG. 3.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for soldering undersurfaces of articles by dipping the undersurfaces thereof in a stream of solder flowing in a given plane comprising a holder for removably receiving and retaining the articles singly, an element supporting the holder and having an upper end and a lower end, a frame fixedly mounted above the stream, a pair of arms having outer ends pivotally connected respectively to the upper and lower ends of the element, a pivot for an inner end of a first one of the arms supported by the frame, a rocking member supported at one end by a fixed positioned pivot carried by the frame operatively connected to the second one of the arms so that said second arm may be rocked about the fixed pivot of the rocking member and moved longitudinally relative to the rocking member, means operable to move the rocking member about its pivot to rock the arms about said fixed positioned pivots to move the element between a soldering position adjacent the stream and a loading position where each soldered article is removed from the holder and each article to be soldered is secured singly to the holder, and tilting means including the rocking member operable to move the second arm longitudinally to rock the element about its pivotal connections with the arms in one direction to cause the undersurface of an article carried by the holder to enter the stream in a plane parallel with the plane of the stream and in another direction to tilt the article to raise one end of the article first out of the stream.

2. An apparatus for soldering undersurfaces of articles according to claim 1 in which a pivotal support for the holder is mounted on the element between the ends thereof, a leg integral with the holder, and a variable stop carried by the element for engagement with the leg to vary the position of the holder relative to the element to assure positioning of the article parallel with the plane of the stream when in the soldering position.

3. An apparatus for soldering undersurfaces of articles according to claim 1 in which a lever has one end fixedly connected to the inner end of the first arm, and force applying means connected to the other end of the lever to cause movement of the arms, the element and the holder away from the stream of solder.

4. An apparatus for soldering undersurfaces of articles according to claim 1 in which the operative connection between the second arm and the rocking member includes an elongated slot in the second arm, and spaced projections mounted on the rocking member and extending into the slot so that the second arm may be moved longitudinally relative to the rocking member to position the article parallel with the stream of solder and so that the second arm may be rocked by the rocking member about the fixed positioned pivot of the rocking member to move the article to the stream of solder.

5. An apparatus for soldering undersurfaces of articles according to claim 4 in which a pair of slides are supported by the frame for movement relative to each other, a link connecting one of the slides to the rocking member, a link connecting the other slide to the upper end of the element, and means to move the slides through operating cycles in a predetermined order to position the article parallel with the plane of the stream, lower the undersurface of the article thus positioned in the stream, tilt the article to raise one end of the article first out of the stream and move the element to the loading position.

References Cited in the file of this patent

UNITED STATES PATENTS

| | | |
|---|---|---|
| 2,671,264 | Pessel | Mar. 9, 1954 |
| 2,875,717 | McWilliams | Mar. 3, 1959 |